Nov. 27, 1928.

C. BROERSMA 1,693,545

TEAT DILATOR

Filed March 23, 1927

INVENTOR.
CHARLES BROERSMA.
BY HIS ATTORNEYS.

Patented Nov. 27, 1928.

1,693,545

UNITED STATES PATENT OFFICE.

CHARLES BROERSMA, OF TONY, WISCONSIN.

TEAT DILATOR.

Application filed March 23, 1927. Serial No. 177,582

This invention relates to a dilator, and while the invention might have various applications, it particularly relates to such a device adapted for dilating a cow's udder. As is well known to those skilled in the art, the cows' udders often have therein lumps disposed in the milk duct, which are sometimes called "spiders", which render it difficult to milk the cow. In such cases it is desirable to open the teat or udder in some manner.

It is an object of this invention, therefore, to provide a very simple and efficient device for dilating or opening the passage through the cow's udder.

It is a further object of the invention to provide such a teat dilator composed of absorbent material, preferably coated with a waterproof coating.

It is more specifically an object of the invention to provide a teat dilator made from some animal fiber such as a sheep casing, which fiber has been sterilized and afterwards preferably coated with medicated waterproof material.

These and other objects and advantages of the invention will be fully set forth in the following description made in connection with the accompanying drawings, in which like reference characters refer to similar parts throughout the several views and in which:—

Figure 1:
Fig. 1 is a view in side elevation of the stick or material from which the dilator is made.
Figure 2:
Fig. 2 is a view in side elevation of the dilator in coated condition.

Referring to the drawings, in Fig. 1 a piece 5 of absorbent material is shown, illustrated as in the form of an elongated narrow stick or strip. While this member 5 might be made of various absorbent materials, preferably of animal origin, in the practice of the invention one material which has been found very suitable is that of sheep casings. The sheep casings, after being cleaned, are then immersed in a strong solution of formaldehyde for three or four days to make them germ proof and to thoroughly sterilize them. They are then dried preferably by artificial heat and cut into the proper lengths. The dried pieces are then substantially in the form shown in Fig. 1. It is possible to use the pieces in this form, but they are preferably coated. While various waterproof or medicated coatings may be used, in practice the material or sticks have been coated with a 5% solution of carbolic acid in melted beeswax. The sticks are dipped into this solution until a considerable uniform coating is placed thereon as illustrated in Fig. 2 where the coating is shown as 6. The dilators are then finished and ready for storage, shipment, or use.

Figure 3:
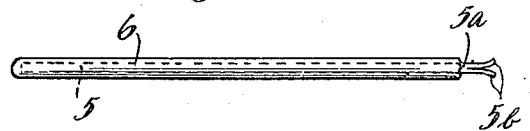
Fig. 3 is a similar view showing the device prepared for use.

When the dilator is to be used, a portion of the coating 6 is removed at one end as illustrated in Fig. 3, where the end portion $5^a$ of the member 5 projects. The end of the member 5 is then slitted with a sharp edge blade to form two or more branches $5^b$. The portions $5^b$ are then inserted through the opening in the cow's udder. The portions $5^b$ are quite small and can readily be inserted in said opening. The moisture from the cow's udder will be absorbed by the members $5^b$ and the member 5 and they will expand to quite a considerable extent. The exposed portion of the member 5 can be made as long as necessary and the device inserted proportionately in the udder. As stated, the member 5 then expands and the opening in the udder is greatly enlarged. The operation is performed without any particular discomfort to the cow and the expansion of the dilator while taking only a short period, is gradual. The opening is then effectively enlarged and the cow can be easily milked.

From the above description it is seen that applicant has provided a simple and efficient means and method for enlarging the duct in an udder, and thus rendering the passage of the milk easier and more comfortable. The device is simple in construction and can be easily and inexpensively made. The same can be shipped and still kept in dry and sanitary condition. The device is, as stated, thoroughly sterilized and if properly handled, there is no danger of infection. The device has been amply demonstrated in actual practice and found to be very successful and efficient.

It will, of course, be understood that various changes may be made in the form, details, arrangement and proportions of the parts, without departing from the scope of applicant's invention, which, generally stated, consists in a device capable of carrying out the objects above set forth, in the novel parts and combinations of parts disclosed and defined in the appended claims.

What is claimed is:—

1. A device for opening an udder comprising an elongated piece of absorbent animal tissue, said member being sterilized and adapted to have its end inserted in the opening in an udder so as to absorb moisture therefrom and expand therein.

2. A device for opening an udder comprising an elongated piece of absorbent animal tissue, said member being sterilized and adapted to have its end inserted in the opening in an udder so as to absorb moisture therefrom and expand therein, and a waterproof coating for said member adapted to be easily removed adjacent one end of said member.

3. A device for opening an udder comprising a small elongated substantially rigid member formed of sterilized animal casing, said member being absorbent and coated when in dry condition with a waterproof coating adapted to be easily removed at one end of said member whereby said member may be inserted in the opening in said udder and absorb moisture therefrom so as to expand and enlarge said opening.

4. A device for opening an udder comprising a small sterilized member formed of sterilized sheep casing, the same being coated with a coating of material formed of beeswax and carbolic acid.

5. A device for opening an udder comprising a small substantially rigid elongated piece of sterilized and dried sheep-casing of a size adapted to have its end inserted in said udder so as to absorb moisture therefrom and expand therein.

In testimony whereof I affix my signature.

CHARLES BROERSMA.